United States Patent

Neuhaus

[11] Patent Number: 5,416,401
[45] Date of Patent: May 16, 1995

[54] DUAL VOLTAGE SUPPLY CIRCUIT FOR VEHICLES

[75] Inventor: Detlev Neuhaus, Hannover, Germany

[73] Assignee: WABCO Standard GmbH, Hannover, Germany

[21] Appl. No.: 191,872

[22] Filed: Feb. 14, 1994

Related U.S. Application Data

[63] Continuation of Ser. No. 891,152, May 28, 1992, abandoned.

[30] Foreign Application Priority Data

Jun. 20, 1991 [DE] Germany .................. 41 20 337.2

[51] Int. Cl.⁶ .................. B60T 8/60; H02J 7/04
[52] U.S. Cl. .................. 320/15; 322/90
[58] Field of Search .................. 320/15; 322/90

[56] References Cited

U.S. PATENT DOCUMENTS

| | | | |
|---|---|---|---|
| 3,624,480 | 11/1971 | Campbell et al. | 320/15 |
| 3,863,127 | 1/1975 | Raver | 320/15 |
| 3,984,750 | 10/1976 | Pfeffer et al. | 322/90 |
| 4,025,860 | 5/1977 | Shibata et al. | 320/15 |
| 4,044,293 | 8/1977 | Follmer | 320/15 |
| 4,214,198 | 7/1980 | Schneider | 320/15 |
| 4,345,197 | 8/1982 | Wheadon et al. | 320/15 |
| 4,449,089 | 5/1984 | Winkler | 320/15 |
| 4,491,779 | 1/1985 | Campbell et al. | 320/6 |
| 4,516,066 | 5/1985 | Nowakowski | 320/15 |
| 4,590,357 | 5/1986 | Winkler | 320/15 |
| 4,686,442 | 8/1987 | Radomski | 320/17 |
| 4,748,395 | 5/1988 | Reynolds | 320/17 |
| 4,788,486 | 11/1988 | Mashino et al. | 320/17 |
| 5,013,991 | 5/1991 | Brune | 320/15 |
| 5,111,132 | 5/1992 | Motose | 320/15 |
| 5,162,720 | 11/1992 | Lambert | 320/15 |
| 5,184,059 | 2/1993 | Patino et al. | 320/15 |
| 5,187,422 | 2/1993 | Izenbaard et al. | 320/2 |
| 5,204,610 | 4/1993 | Pierson et al. | 320/15 |
| 5,245,267 | 9/1993 | Pierret et al. | 320/15 |
| 5,280,232 | 1/1994 | Kohl et al. | 322/23 |

FOREIGN PATENT DOCUMENTS

| | | | |
|---|---|---|---|
| 1413590 | 3/1969 | Germany . | |
| 2010597 | 9/1970 | Germany | H02J 9/06 |
| 2503269 | 7/1976 | Germany | 320/15 |
| 2936675 | 3/1981 | Germany | H02J 9/00 |
| 3235349 | 3/1984 | Germany | B60R 16/04 |
| 3422364 | 12/1984 | Germany | H02J 9/00 |
| 3441461 | 5/1985 | Germany | H02J 9/00 |
| 3506419 | 6/1986 | Germany | B60T 13/68 |
| 3502100 | 7/1986 | Germany | B60T 13/66 |
| 3521486 | 12/1986 | Germany | B60T 13/66 |
| 3536447 | 4/1987 | Germany | H03F 1/52 |
| 3626601 | 2/1988 | Germany | B60R 21/00 |
| 3844607 | 2/1990 | Germany | B60R 16/02 |
| 3907762 | 9/1990 | Germany | B60T 13/66 |
| 0039239 | 2/1989 | Japan | 320/15 |
| 2013048 | 8/1979 | United Kingdom | H02J 9/00 |
| 2067034 | 7/1981 | United Kingdom | H02J 9/00 |
| 2196078 | 4/1988 | United Kingdom | B60T 13/66 |
| 0000617 | 9/1979 | WIPO | 320/15 |

OTHER PUBLICATIONS

Jesn Wittje, "Duo Power im Auto" Funkschau 24/1985 pp. 80–82.

*Primary Examiner*—Thomas M. Dougherty
*Attorney, Agent, or Firm*—Meltzer, Lippe, Goldstein, Wolf, Schlissel & Sazer

[57] ABSTRACT

A dual voltage supply circuit for vehicles is disclosed, in particular for vehicles with a dual circuit electrical braking system. The circuit contains a starter battery and an auxiliary battery, each supplying an electrical braking circuit. The two batteries are charged from a three phase generator which has power diodes and excitation diodes. The auxiliary battery is charged via an electrical path from the excitation diodes. A monitoring module, which includes a charge monitoring system and a time delay, is connected in series between the excitation diodes and the auxiliary battery.

13 Claims, 3 Drawing Sheets

DUAL VOLTAGE SUPPLY CIRCUIT FOR VEHICLES

This is a continuation of application Ser. No. 07/891,152, filed May 28, 1992 now abandoned.

FIELD OF THE INVENTION

The present invention relates to a dual voltage supply circuit for vehicles, in particular, vehicles with a dual circuit electrical braking system.

BACKGROUND OF THE INVENTION

Electrical braking systems are considered to be the alternative which will replace conventional braking systems in the future. Conventional braking systems (e.g., in commercial vehicles) transmit a signal indicating the desire to apply the brakes (actuation of the brake pedal by the driver) through pneumatic or hydraulic systems. Electrical braking systems (EBS), on the other hand, transmit this braking signal by means of electrical conductors. The actual braking force in either system is supplied by means of one or more hydraulic or pneumatic brake cylinders. EBS provides several advantages including increasing the speed of brake signal transmission. Additionally, an EBS can account for important braking factors such as the load, brake lining wear, an antilock braking system, etc.

The braking system is by its nature the most important element to ensure the travel safety of the vehicle. For this reason, isolated, i.e., separated, storage devices are required for storing pneumatic or hydraulic energy as well as electrical energy (batteries). This requirement applies even to fully electronic dual circuit braking systems.

Electrical energy storage devices must be recharged in accordance with this criterion from a common energy source or charging device (generator). For safety reasons, energy must flow only from the charging device to the electrical energy storage devices so that a malfunction, such as a short circuit in one electrical energy storage device, will not have an adverse effect on the other electrical energy storage device.

A voltage supply circuit of the type described above is disclosed in German patent document DE-A 35 02 100 published on Jul. 31, 1986. This reference discloses a voltage monitoring system for an auxiliary battery. In the case of a battery failure, a switching device switches the supply line of both circuits to the working battery so that the working battery supplies power to both of the circuits.

A disadvantage of this prior art circuit is that the charging of the auxiliary battery is not always assured if the starter battery fails. Furthermore, the diode circuit used for the separation of the two batteries consumes a relatively large amount of energy. A diode circuit connected between the charging device and the auxiliary battery is essentially disadvantageous because the charging voltage received by the auxiliary battery from the main power circuit is reduced by the potential drop across the diode circuit. As a result, the auxiliary battery is only partially charged.

It is therefore the object of the present invention to provide a dual voltage supply circuit for vehicles which safely separates, and uniformly charges, the first (starter battery) and second (auxiliary battery) charge storage devices.

SUMMARY OF THE INVENTION

These and other objects are achieved by the present invention which provides a voltage supply for vehicles with a dual circuit electrical braking system. The voltage supply comprises a starter battery, an auxiliary battery and a three phase generator for charging the starter and auxiliary batteries. The three phase generator includes power diodes for charging the starter battery via an electrical path and excitation diodes for charging the auxiliary battery via another electrical path.

BRIEF DESCRIPTION OF THE DRAWINGS

The invention is explained in further detail through the drawings in which.

DESCRIPTION OF THE INVENTION

Figure 1:
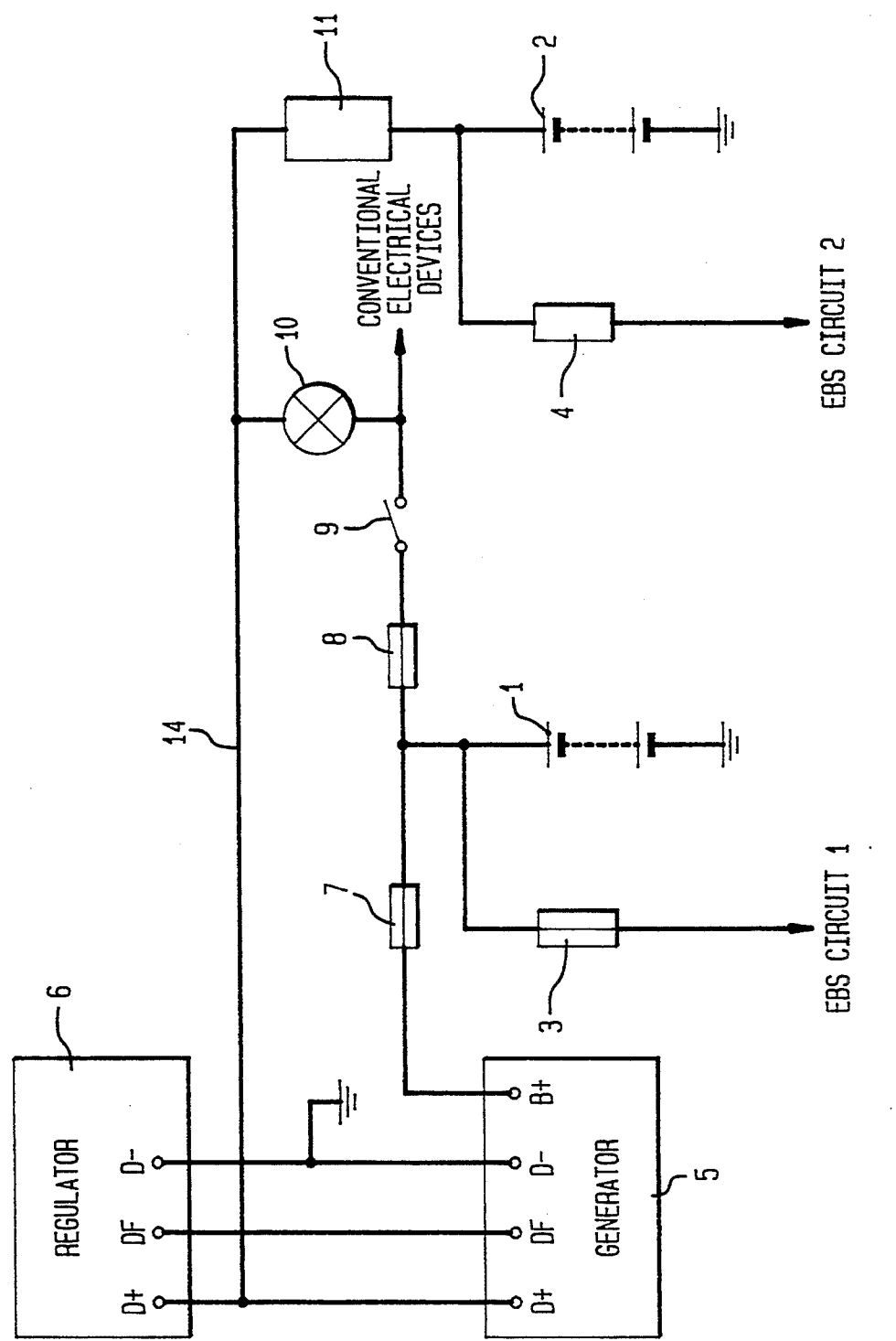
FIG. 1 shows a schematic diagram of a dual voltage supply circuit for a dual EBS circuit according to an embodiment of the invention.

A schematic diagram of a dual voltage supply circuit according to one embodiment of the invention is shown schematically in FIG. 1. As depicted, the voltage supply circuit has a starter battery 1 and an auxiliary battery 2. The starter battery 1 supplies current via a fuse 8 and a driving switch 9 to the conventional electrical devices of the vehicle. The supply of the starter motor, which is generally controlled via a separate solenoid switch, is not shown here for purposes of brevity.

The first circuit of a dual electrical braking system (EBS) circuit is connected to the starter battery 1 via an additional fuse 3. Similarly, an auxiliary battery 2 is connected to the second circuit of the dual electrical braking system (EBS) circuit via an additional fuse 4.

Both batteries 1 and 2 must be continually charged by the vehicle's generator 5. The starter battery 1 is charged via a lead connecting the B+ terminal (and thereby the power diodes 12) of the generator 5 (see FIG. 2) to an additional fuse 7 which, in turn, is connected to the positive pole of the starter battery 1. Additional terminals D+, DF and D− of the generator 5 are connected to corresponding terminals of a regulator 6. The generator 5 and the regulator 6 are standard components which are described in further detail below.

A charge control lamp 10 is used to monitor the charging of the starter battery 1. The lamp 10 is connected between the driving switch 9 and, via a conductor 14, the D+ terminals of the regulator 6 and the generator 5. The charge control lamp 10 turns off when the engine is running and the energizing voltage produced at the D+ terminal of the generator 5 exceeds the voltage of the starter battery 1.

Figure 2:
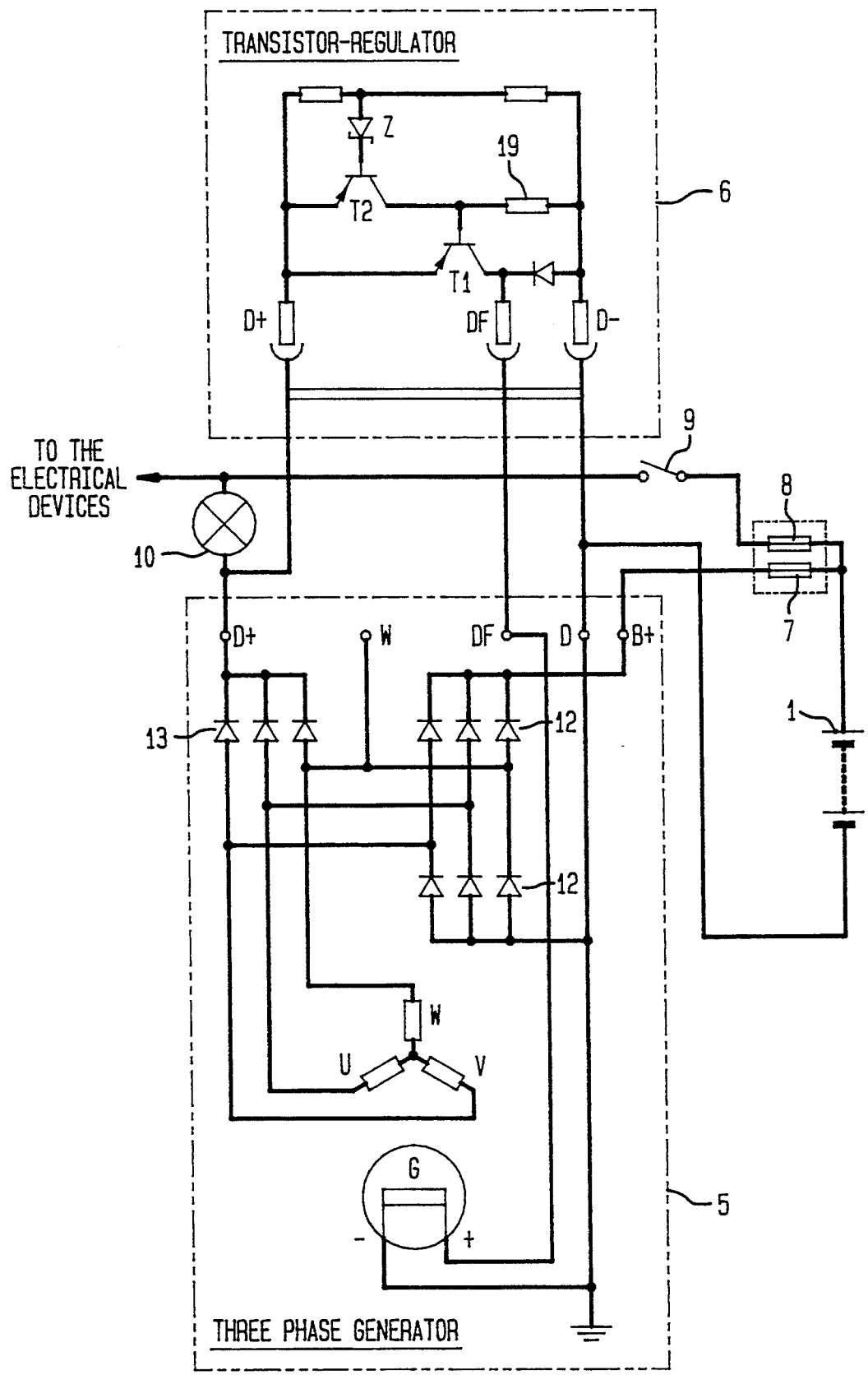
FIG. 2 shows a schematic diagram of the interconnection of the dual voltage supply circuit of FIG. 1 and a conventional generator-regulator circuit.

According to the present invention, the auxiliary battery 2 is connected via the conductor 14 to the D+ terminal and thereby to the excitation diodes 13 of the generator 5 (see FIG. 2). Furthermore, a monitoring module 11 is illustratively connected in series between the D+ terminal of the generator 5 and the positive terminal of the auxiliary battery 2. The monitoring module 11 is discussed in detail below.

Referring now to FIG. 2, a circuit currently used in conventional motor vehicles to charge the starter battery 1 is shown in greater detail. Identical parts previously described are designated by the same reference numbers as in FIG. 1. The conventional charging circuit typically comprises a three phase alternating current generator. Such three phase alternating current generators generally have a primary winding G which is supplied from the DF terminal of the regulator 6. The regulator 6 depicted in FIG. 2 is a transistor-regulator.

The secondary winding of the generator (UVW) comprises three windings U, V, W connected in a star configuration. Each lead of the secondary winding UVW is connected to power diodes 12 in order to supply current to recharge the starter battery 1. In addition, so-called excitation diodes 13 are also connected to the secondary winding UVW in order to supply current to the winding G via the transistor-regulator 6 and its terminal DF when the voltage of the starter battery 1 is low.

When the generator 5 begins to rotate, the residual magnetism in the ferro-magnetic circuit of the generator 5 is sufficient to produce a low excitation voltage. This excitation voltage is transmitted to the transistor regulator 6 and thereby drives a low current through the primary winding G. This low current amplifies the magnetic field, leading to a further increase of the excitation voltage. Through this resonance amplification effect, the generator output voltage builds up until the generator output voltage reaches its nominal voltage. As soon as the nominal voltage is exceeded, the transistor regulator 6 maintains the excitation of the winding G at a level which continually produces a given value of the nominal voltage.

The operation of a conventional transistor regulator is now discussed. While the voltage at the terminal D+ is lower than the nominal battery voltage of the starter battery 1, such as when the engine of a vehicle is started, the excitation current is permitted to flow through the transistor T1 and the terminal DF to the primary winding G because the base contact of T1 is connected via a resistor 19 to a negative voltage (i.e., ground). During that time, the transistor T2 operates in the cut-off regime (i.e., the transistor T2 is blocking) because a Zener diode Z connected to the base of the transistor T2 is blocking. Eventually, as the nominal voltage of the terminal D+ increases, the reverse bias across the Zener diode reaches the Zener breakdown voltage. As soon as Zener breakdown occurs at the Zener diode Z, the transistor T2 becomes conductive. When T2 becomes conductive, a current flowing from its collector through the resistor 19 produces a positive voltage at the base of the transistor T1 causing the transistor T1 to cut-off. The excitation current is thereby interrupted and the nominal voltage begins to drop. This process is repeated continually so that a fixed nominal voltage is maintained. The voltage level of this fixed nominal voltage is thus mainly determined by the network containing the Zener diode Z.

As depicted in FIG. 2, the positive terminal of the starter battery 1 is connected via the driving switch 9 and the charge control lamp 10 to the D+ terminal of the transistor regulator 6. Thus, part of the excitation current is supplied by the starter battery 1. This current flows through the driving switch 9, the charge control lamp 10 and the transistor T1 to the terminal DF and thereby through the primary winding G of the generator 5 to the ground.

Once the starter battery 1 has been fully charged, the excitation diodes 13 may be used according to the present invention to charge the auxiliary battery 2 of the second circuit of the electronic braking system. As depicted in FIG. 1, a monitoring module 11 is connected in series between the D+ terminal and auxiliary battery 2. The monitoring module 11 improves the reliability of the system and is shown in greater detail in FIG. 3.

Preferably, the excitation diodes 13 should only charge the auxiliary battery 2 when the above-described generator build-up process has been completed and the generator voltage has reached its nominal value. At that point in time, the starter battery 1 has also nearly reached its nominal voltage and thus the regulator 6 decreases the excitation current.

Figure 3:
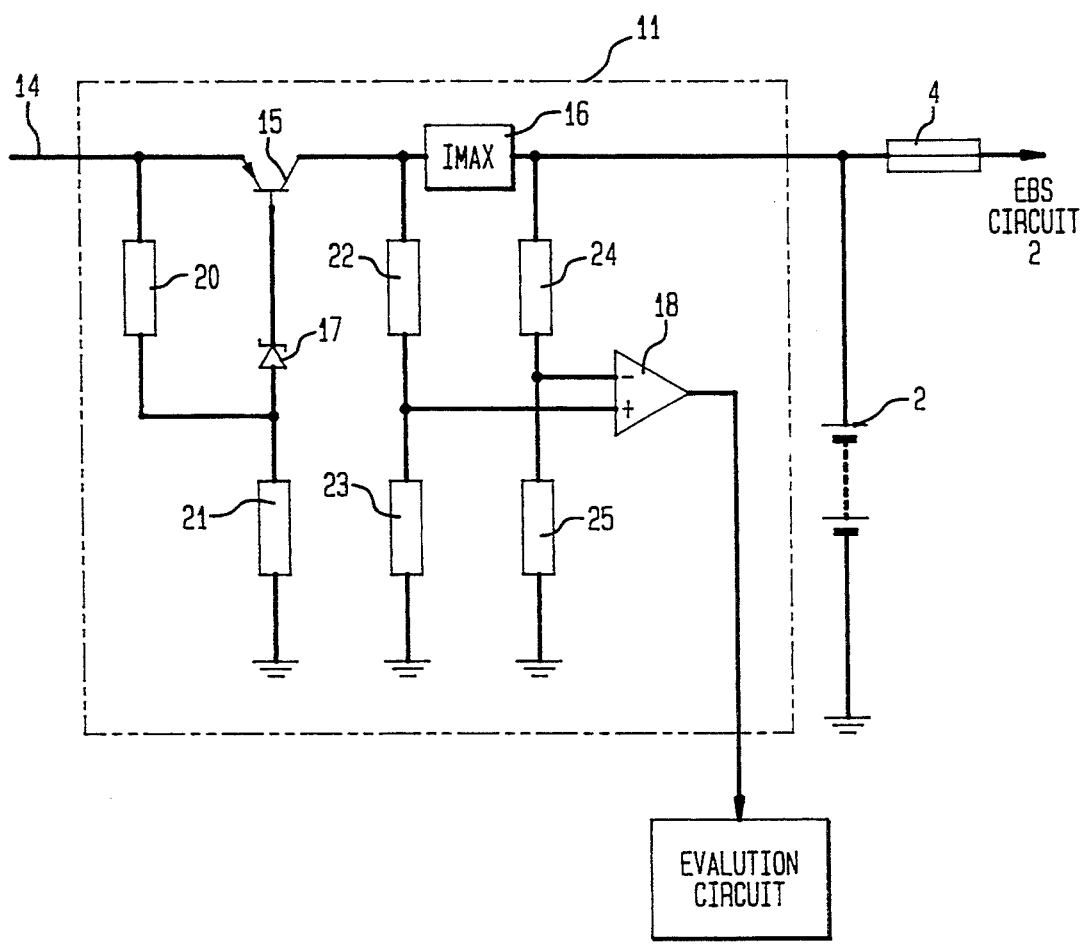
FIG. 3 shows a schematic diagram of a monitoring module of the dual voltage supply circuit of FIG. 1.

As shown in FIG. 3, the charging of the auxiliary battery is achieved by a transistor 15, a Zener diode 17 connected to the base of the transistor 15 and a resistor circuit 20, 21. The transistor 15 is conducting only when the voltage of the conductor 14 has increased to the point where the Zener diode 17 breaks down and becomes substantially conducting. By virtue of this process, a voltage-dependent time delay for the charge of the auxiliary battery 2 is realized.

The auxiliary battery 2 typically has a much smaller capacity than the starter battery 1. This is because the auxiliary battery 2 is loaded at its nominal value only when the brake is actuated. Hence, only a small maintenance charge generally is required during un-braked travel. In order to protect the auxiliary battery 2 from an overload, and to avoid overloading the excitation diodes 13, a charge current limiter 16 is provided. The current limiter 16 limits the amperage of the current flow to a value $I_{max}$. Illustratively, the value of $I_{max}$ may be approximately 1 Ampere. The internal structure of such a current limiter 16 is known to a person skilled in the art and is therefore not shown in further detail.

Finally, a charge monitoring system may illustratively be provided comprising two voltage dividers, respectively formed by the resistors 22, 23 and 24, 25. The first voltage divider 22–23 is connected before the current limiter 16 and the second voltage divider 24–25 is connected after the current limiter 16. The non-inverting input of the operational amplifier 18 is connected to the point between the resistors 22 and 23. The inverting input of the operational amplifier is connected to the point between the resistors 24 and 25. By means of the voltage dividers 22–23 and 24–25, the operation of the current limiter 16 may be monitored. As soon as the current limiter 16 restricts the flow of current therethrough, a voltage drop appears across the element 16. This is detected at the operational amplifier 18 (connected as a difference amplifier) which transmits a signal indicative of the voltage drop to an output conductor S. The latter is connected to an evaluation circuit such as a micro-controller (not shown).

The evaluation circuit connected to the output conductor S illustratively measures the frequency and durations during which the charge current limiter 16 is in action, and thereby determines when the auxiliary battery 2 is being charged with the maximum current $I_{max}$. It may be appreciated that the charge current drops as the auxiliary battery 2 increases its charged state.

From the frequency and time durations of the individual charge processes of the auxiliary battery 2, the evaluation circuit connected to the output conductor S can determine whether the auxiliary battery 2 is functioning properly. This determination is illustratively achieved using suitable software.

The charging of the auxiliary battery of the electrical braking system according to the present invention ensures a uniform, isolated supply to the auxiliary battery. By comparison with other known charge circuits, only a minimal additional technical expenditure is required to achieve this end.

Finally, the above discussion is intended to be merely illustrative. Numerous other embodiments may be devised by those skilled in the art without departing from the scope of the following claims.

I claim:

1. A voltage supply for vehicles with a dual circuit electrical braking system comprising,
    a starter battery,
    an auxiliary battery,
    a three phase generator electrically connected to said starter battery and said auxiliary battery;
    a first electrical path connecting said three phase generator and said starter battery including a set of power diodes, having a diode for each phase of the three phase generator for charging said starter battery,
    a second electrical path connecting said three phase generator and said auxiliary battery including a set of excitation diodes having a diode for each phase of the three phase generator for charging said auxiliary battery,
    a first monitor between said first and second electrical paths, connect to monitor charging of said starter battery, and
    a second monitor between said excitation diodes and said auxiliary battery connected such that only current flowing through said second monitor is received from said excitation diodes at said auxiliary battery.

2. The voltage supply of claim 1, wherein said second monitor further comprises a charge current limiter connected between said excitation diodes and said auxiliary battery.

3. The voltage supply of claim 2, wherein said second monitor further comprises a charge monitoring system connected on either side of said charge current limiter.

4. The voltage supply of claim 1, wherein said first monitor includes a regulator circuit configured to shut off when said starter battery is charged to a nominal voltage, thereby causing voltage on said second electrical path to increase.

5. The voltage supply of claim 4, wherein said second monitor includes a delay circuit configured so that charging of said auxiliary battery is delayed until said first monitor shuts off.

6. The voltage supply of claim 3, wherein said charge monitoring system comprises,
    a first voltage divider connected at an input of the current limiter,
    a second voltage divider connected at an output of the current limiter,
    an operational amplifier having a non-inverting input connected to receive a first voltage of said first voltage divider and an inverting input connected to receive a second voltage of said second voltage divider, and
    an evaluation circuit connected to an output of said operational amplifier.

7. The voltage supply of claim 1, wherein said second monitor further comprises,
    a transistor having a base, an emitter connected to said generator and a collector connected to said auxiliary battery,
    a Zener diode having an anode connected to said base of said transistor, and
    a first resistor connected to a second resistor, a cathode of said Zener diode connected between said first and second resistors and said first resistor connected to said emitter, connected so that said transistor conducts current when voltage on said second electrical path increases so that said diode breaks down and conducts.

8. The voltage supply of claim 6, wherein the evaluation circuit includes a microcontroller for measuring frequency and duration of action of said charge current limiter, thereby determining when said auxiliary battery is being charged and functioning properly.

9. The voltage supply of claim 6, wherein the output of the operational amplifier represents voltage drops and the evaluation circuit includes a microcontroller programmed to detect frequency and duration of the voltage drops.

10. The voltage supply of claim 1, wherein the starter battery is connected to a first circuit and the auxiliary battery is connected to a second circuit.

11. The voltage supply of claim 1, wherein the starter battery and the auxiliary battery are charged by the same three phase generator.

12. A voltage supply for vehicles with a dual circuit electrical breaking system comprising:
    a starter battery;
    an auxiliary battery;
    a three phase generator electrically connected to said starter battery and said auxiliary battery;
    a first electrical path connecting said three phase generator and said starter battery including a set of power diodes, having a diode for each phase of the three phase generator for charging said starter battery;
    a second electrical path connecting said three phase generator and said auxiliary battery including a set of excitation diodes having a diode for each phase of the three phase generator for charging said auxiliary battery;
    a first monitoring means for monitoring the charging of said battery connected between said first and second electrical paths, and for shutting off once said starter battery is charged to a nominal voltage, thereby causing voltage on said second electrical path to increase; and
    a second monitoring means connected between said excitation diodes and said auxiliary battery such that only current flowing through said second monitoring means is received from said excitation diodes at said auxiliary battery, said second monitoring means also comprising:
        (a) delay means for delaying charging of said auxiliary battery until said first monitoring means shuts off;
        (b) a charge current limiter connected between said excitation diodes and said auxiliary battery;
        (c) and a charge monitoring system connected on either side of said charge current limiter, said charge current monitoring system comprising:
            (i) a first voltage divider connected between said delay means and said current limiter,
            (ii) a second voltage divider connected between said current limiter and said auxiliary battery, (iii) an operational amplifier having a non-inverting input connected to said first voltage divider and an inverting input connected to said second voltage divider; and (iv) a means for detecting frequency and duration of operation of said charge current limiter connected to an output of said operational amplifier.

13. The voltage supply of claim 12, wherein said means for detecting comprises a microcontroller for measuring frequency and duration of action of said charge current limiter, thereby determining one said auxiliary battery is being charged and functioning properly.

* * * * *